United States Patent [19]

Kruse

[11] Patent Number: 5,072,102
[45] Date of Patent: Dec. 10, 1991

[54] READER APPARATUS FOR CHIP CARDS

[75] Inventor: Dietrich Kruse, Ottobrunn, Fed. Rep. of Germany

[73] Assignee: Siemens Aktiengesellschaft, Munich, Fed. Rep. of Germany

[21] Appl. No.: 527,437

[22] Filed: May 23, 1990

[30] Foreign Application Priority Data

May 30, 1989 [DE] Fed. Rep. of Germany .. 8906634[U]

[51] Int. Cl.$^5$ .......... G06K 7/06; G06K 13/00; G06K 13/08
[52] U.S. Cl. .................. 235/441; 235/475; 235/477; 235/480
[58] Field of Search .......... 235/441, 439, 440, 375, 235/475, 480, 486, 384, 477

[56] References Cited

U.S. PATENT DOCUMENTS

| 4,724,310 | 2/1988 | Shimamura et al. | 235/486 X |
| 4,734,567 | 3/1988 | Hansbauer | 235/486 X |
| 4,803,349 | 2/1989 | Sugimoto et al. | 235/475 |
| 4,871,905 | 10/1989 | Mita et al. | 235/475 |

FOREIGN PATENT DOCUMENTS

| 0134110 | 3/1985 | European Pat. Off. | 235/439 |
| 0169745 | 1/1986 | European Pat. Off. | 235/480 |
| 8413519 | 5/1990 | Fed. Rep. of Germany | . |
| 2566558 | 12/1985 | France | 235/439 |
| 2607290 | 5/1988 | France | 235/486 |

Primary Examiner—Stuart S. Levy
Assistant Examiner—Tien Ba Pham
Attorney, Agent, or Firm—Hill, Van Santen, Steadman & Simpson

[57] ABSTRACT

Reader apparatus for chip cards. The reader apparatus has a reader station with at least one insertion opening for a chip card and is also equipped with a bidirectional drive and a contact device for reading the chip card. Respective inward transfer and/or outward transfer conveying channels are provided adjacent the insertion opening and adjacent a further opening of the reader station lying opposite the insertion opening. Each of the conveying channels has an outer opening, and a respective, bidirectional drive that is independent of the drive of the reader station, each of the drives having conveyor belts arranged in pairs. Controllable locks are also provided inside the reader station in the region of the two openings, these locks stopping the chip card in a read/write position, the chip card being supplied from the opening lying opposite the lock stopping the card.

10 Claims, 1 Drawing Sheet

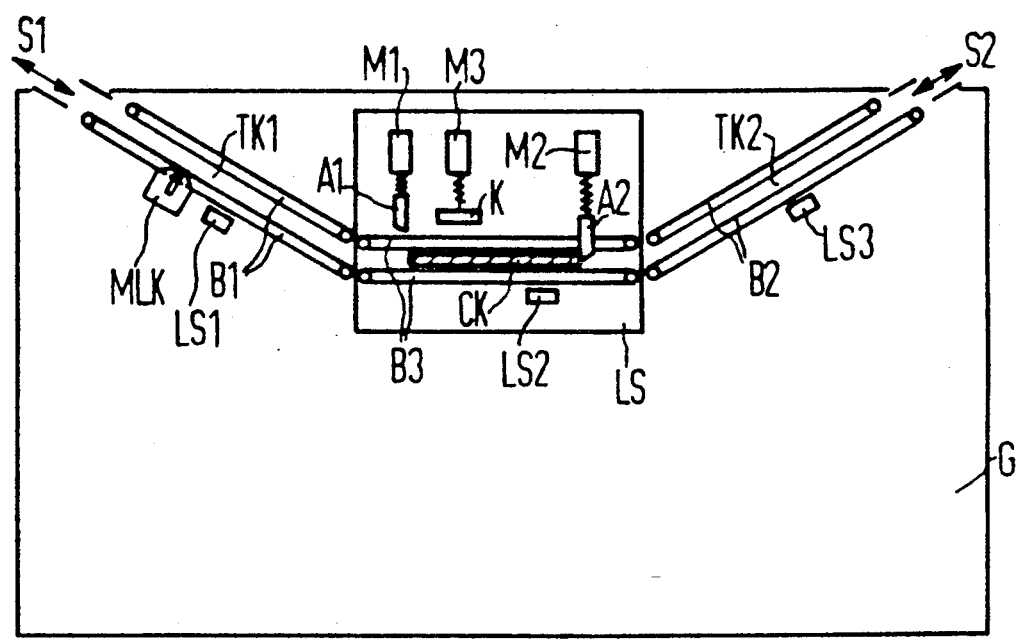

READER APPARATUS FOR CHIP CARDS

BACKGROUND OF THE INVENTION

The present invention is directed to a reader apparatus for chip cards and, in particular, a reader apparatus for chip cards having a reader station with at least on insertion opening for the card and equipped with a bidirectional drive and a contact means for at least reading the card.

In addition to the long-familiar magnetic strip card, the chip card is playing an increasingly greater role in a large variety of equipment, particularly because it offers considerable advantages over the passive magnetic strip card with respect to intelligence, activity, data protection and multi-functionality. In addition, the two types of cards also differ in regards to their operating modes. Whereas a relative motion between the card and a write-read head of a reader is absolutely necessary for the magnetic strip card, the chip card requires the exact opposite, that is, no relative motion whatsoever between contact points of the integrated circuit in the chip card and the contact arrangement of the reader apparatus.

The relative motion required for magnetic strip cards, however, has the advantage that this motion can also be manually implemented, that is, without mechanical drive means, a measure that is advantageously practiced in what are referred to as pull-through readers. These pull-through readers have proven successful particularly in personal admission systems, particularly in combination with turnstiles, revolving doors or the like, because the card can be practically read when a user is passing by, that is in a rather off-hand manner during the walking motion of the user.

It would therefore be inherently desirable to also utilize the advantages of the pull-through method in combination with the chip card even though the prior art chip card seems inherently unsuited for this purpose because it is absolutely necessary for the card to remain stationary at least for a short time during the contacting and reading event.

SUMMARY OF THE INVENTION

It is an object of the present invention to provide a reader apparatus for chip cards such that it can be operated in a fashion analogous to the pull-through procedure.

Proceeding from a reader apparatus of the type initially cited, this object is achieved by a combination of the following elements:

respective inward transfer and/or outward transfer conveying channels are provided adjacent the insertion opening and adjacent a further opening of the reader station lying opposite the insertion opening, the conveying channels each having an opening;

the two conveying channels each having a respective bidirectional drive that is independent of the drive of the reader station; and respectively controllable locks provided within the reader station in the region of the two openings, the controllable locks stopping the chip card in the read/write position, the chip card being supplied from the opening lying opposite the lock stopping the chip card.

In further developments of the present invention, the individual drives are composed of endlessly circulating conveyor belts that are respectively arranged in pairs and entrain the chip card lying therebetween.

The locks can be controlled by lifter magnets.

Respective light barriers that monitor the conveying of the chip card can be provided in the reader station and in the conveying channels. Also, magnetic read heads can be located in the inward transfer and/or outward transfer conveying channels.

BRIEF DESCRIPTION OF THE DRAWING

The features of the present invention which are believed to be novel, are set forth with particularity in the appended claims. The invention, together with further objects and advantages, may best be understood by reference, to the following description taken in conjunction with the accompanying drawing, and in which:

The single FIGURE shows a schematic view of the principle of a reader apparatus for chip cards according to the present invention.

DESCRIPTION OF THE PREFERRED EMBODIMENT

In detail, the novel reader apparatus accommodated in a housing G is composed of a reader station LS and two inward transfer and/or outward transfer conveying channels TK1, TK2 that open out of the housing G at opposite ends of the reader station LS. Both the reader station LS as well as the conveyor channels TK1, TK2 have separate drive systems that are each respectively composed of conveyor belts B3, B1, B2 that are arranged in pairs and enclose the chip card CK between them. The respectively bidirectional drive systems can be driven independently of one another, so that it is possible to use the apparatus from either side.

The operation of the reader shall be set forth in greater detail below with reference to the example of a chip card CK supplied via the insertion slot S1. When the chip card is inserted, the conveyor belts B1 are driven such that they draw the chip card CK into the conveying channel TK1 and transfer it to the conveyor belts B3 of the reader station LS that have also been set in motion. A lock A2 that is provided at the back end of the reader station LS with reference to the insertion direction and that is controlled by a lifter magnet M2 causes the chip card CK to stop in defined fashion. the conveyor belts B3, B1 are now shut off and the contact means K of the reader station is lowered onto the contact surface of the chip card CK using the lifter magnet M3. As soon as the read and/or write event is ended, the contact means K is in turn lifted by the lifter magnet M3. The lock A2 which has also been lifted releases the chip card CK so that, driven by the conveyor belts B3 and B2, it is conveyed through the conveying channel TK2 to the delivery slot S2. Further conveying of the card out of the reader station in conjunction with access barriers can, for example, be made advantageously dependent thereon as a function of whether a turnstile, a revolving door or the like has been turned or whether a person has passed a barrier.

Since the conveyor belts B1, B2, B3 can be moved in either direction, the operation just set forth can also occur in the opposite direction. Instead of the lock A2, the lock A1 provided at the other end of the reader station LS is activated using the lifter magnet M1. It is a further feature of the present invention that a chip card supplied at the insertion slot S1 can be conveyed back to the insertion slot S1 when, for example, the card cannot be read or when the card is invalid. The analogous case applies to a card introduced at the slot S2 and conveyed back to this location. Sensors, particularly light sensors LS1, LS2, LS3 in the region of the reader station LS and in the region of the conveying channels TK1, TK2, can be used to identify the current location of the chip card CK. In particular, this may be necessary when a further card was erroneously introduced, whereby the second card can then be conveyed back out by an appropriate directional drive of the conveyor belts.

A magnetic read head MLK can also be additionally provided in the inward transfer and/or outward transfer conveying channel TK1, TK2, so that magnetic strip cards or hybrid cards containing both a chip as well as magnetic strips can also be utilized.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Reader apparatus for chip cards having a reader station with at least one insertion and delivery opening for the card and equipped with a bidirectional drive and a contact means, comprising:
   first and second inward transfer and outward transfer conveying channels provided adjacent the insertion and delivery opening and adjacent a further opening in the reader station lying opposite the insertion and delivery opening, respectively, each conveying channel having an outer opening;
   the two conveying channels each having a respective bidirectional drive that is independent of the drive of the reader station;
   at least first and second controllable locks provided within the reader station in the region of the two openings, respectively, of the reader station, one of said controllable locks stopping the chip card in a read/write position the chip card respectively supplied from the opening lying opposite the one of said controllable locks, the card exiting the reader apparatus from the other opening; and
   each of the conveying channels and the reader station having at least one respective sensor that monitors the conveying of the chip card.

2. The reader apparatus according to claim 1, wherein each of the bidirectional drives are composed of endlessly circulating conveyor belts that are respectively arranged in pairs and entrain the chip card when lying therebetween.

3. The reader apparatus according to claim 1, wherein each of the locks is controlled by an associated lifter magnet.

4. The reader apparatus according to claim 1, wherein the respective sensors that monitor the conveying of the chip card are light sensors.

5. The reader apparatus according to claim 1, wherein a magnetic read head is located in at least one of the inward transfer and/or outward transfer conveying channels.

6. The reader apparatus according to claim 1, wherein at least one magnetic read head is located in at least one of the inward transfer and/or outward transfer conveying channels.

7. Reader apparatus for chip cards having a reader station having first and second opposed openings for the card, bidirectional means for transporting the card and means for at least reading the card, comprising:
   first and second inward transfer and/or outward transfer conveying channels, the first channel located adjacent the first opening of the reader station and the second channel located adjacent the second opening of the reader station;
   the two conveying channels each having a respective bidirectional means for transporting the card that is independent of the means for transporting the card of the reader station;
   at least first and second controllable locks in the reader station in the region of the first and second openings, respectively, one of the controllable locks stopping the chip card in a position adjacent the means for at least reading the card, the card being supplied from the opening lying opposite the position of the lock stopping the card and the card exiting the reader apparatus from the other opening.

8. The reader apparatus according to claim 7, wherein the respective bidirectional means for transporting the card are composed of endlessly circulating conveyor belts that are respectively arranged in pairs and entrain the chip card lying therebetween.

9. The reader apparatus according to claim 7, wherein each of the locks are controlled by an associated lifter magnet.

10. The reader apparatus according to claim 7, wherein at least one light sensor that monitors the conveying of the chip card is provided in at least one of the reader station or the conveying channels.

* * * * *